United States Patent
Ponce de Leon et al.

(10) Patent No.: US 6,211,791 B1
(45) Date of Patent: Apr. 3, 2001

(54) WARNING SYSTEM FOR EXCESSIVE APPARENT TEMPERATURE CONDITIONS

(76) Inventors: Sherry A. Ponce de Leon, 333 S. State St., Chicago, IL (US) 60604; Conrad Pagan, 2150 N. California Ave., Chicago, IL (US) 60647

( * ) Notice: Subject to any disclaimer, the term of this patent is extended or adjusted under 35 U.S.C. 154(b) by 0 days.

(21) Appl. No.: 09/577,746

(22) Filed: May 23, 2000

Related U.S. Application Data

(60) Provisional application No. 60/185,923, filed on Feb. 29, 2000.

(51) Int. Cl.$^7$ .................................................. G01W 1/00
(52) U.S. Cl. ..................... 340/601; 340/522; 340/539; 340/584; 379/40; 379/51; 702/3
(58) Field of Search ................................. 340/539, 584, 340/601, 602, 522; 379/40, 51; 702/3

(56) References Cited

U.S. PATENT DOCUMENTS

| | | | |
|---|---|---|---|
| 5,659,292 | * 8/1997 | Tice ........................................ | 340/522 |
| 5,720,176 | * 2/1998 | Manson et al. ........................... | 62/89 |
| 5,920,827 | * 7/1999 | Baer et al. ............................... | 702/3 |

* cited by examiner

Primary Examiner—Daniel J. Wu
(74) Attorney, Agent, or Firm—Ladas & Parry; Vangelis Economou

(57) ABSTRACT

An apparent temperature monitor and/or alarm comprises separate sensors that monitor at least ambient temperature and humidity of a location in which an occupant resides. It has been noted that certain elderly and/or poor residents of urban areas may be unable to self-monitor their environmental and health situation, and that use of an apparent temperature monitor/alarm may assist in preventing mortality of elderly occupants or those who are unable to fend for themselves. A system for monitoring a large number of remote locations may also be established and appropriate health or safety personnel may be directed from a central monitoring location to investigate specific occupants or remote locations indicative of unhealthy environmental conditions.

15 Claims, 1 Drawing Sheet

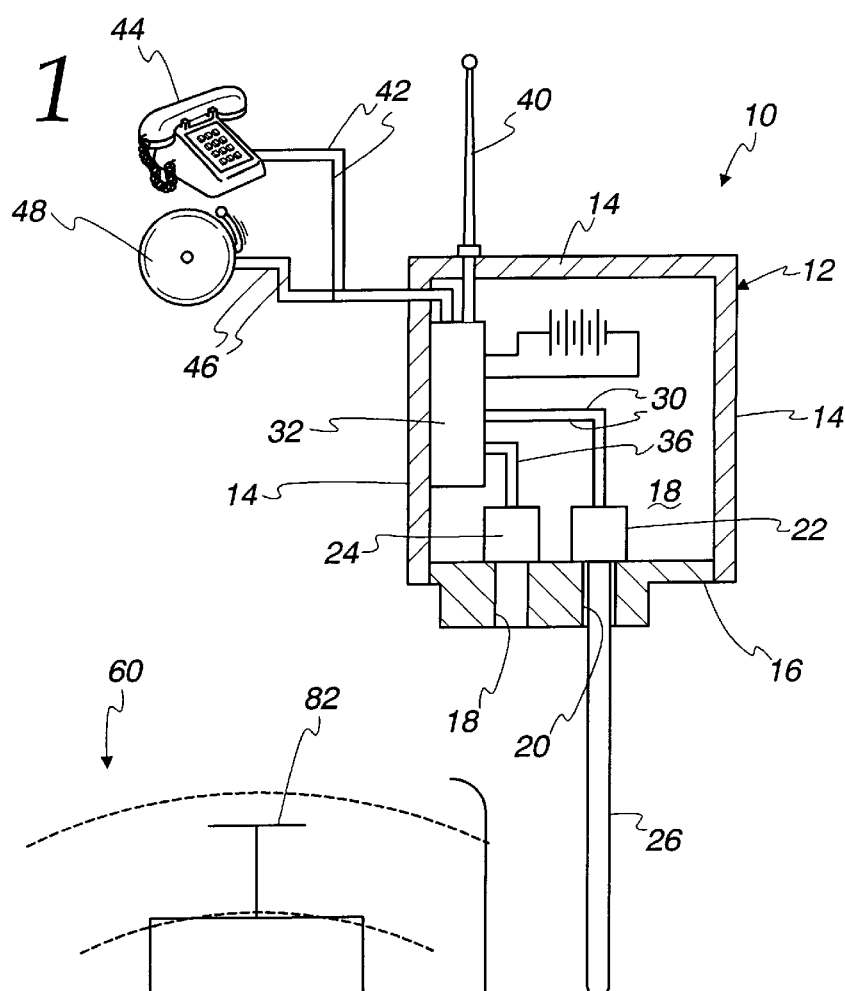
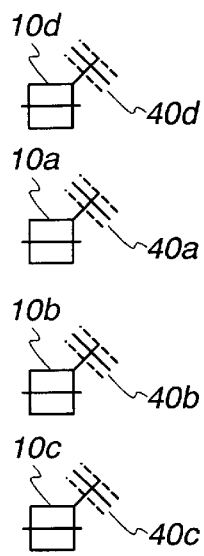

WARNING SYSTEM FOR EXCESSIVE APPARENT TEMPERATURE CONDITIONS

CROSS-REFERENCE TO RELATED APPLICATIONS

This invention claims the benefit of U.S. Application Ser. No. 60/185,923, filed on Feb. 29, 2000.

BACKGROUND OF THE INVENTION

1. Field of the Invention

This invention relates generally to warning systems, and more specifically, to residential warning systems for warning of a rise in the ambient conditions of a residence which may present a health danger to the occupants of a monitored space.

2. Background of the Invention

It has been noted that extreme heat and temperature conditions during summer months have become hazardous for frail and physically compromised persons. The phenomenon has been especially hazardous, and oftentimes lethal, to susceptible or unattended individuals, for example, infants and poor elderly persons living alone in cramped, closed-up apartments in inner city neighborhoods. Generally, poor people cannot afford a temperature or humidity controlling device, such as an air conditioner. The fear of crime in poor housing neighborhoods mandates keeping the windows closed and locked. Under such conditions, apartments take on the characteristics of an oven when ambient weather conditions are oppressively hot and humid. This occurs fairly regularly, and when the occupied building is in direct sunshine, the temperatures in apartments may exceed 130° F. (55° C.).

Conditions may become excessively extreme, even when the ambient temperature does not reach life-threatening levels, if weather conditions also include high humidity. Taking both temperature and humidity into account, ambient conditions may become dangerous to health at even lower temperatures. The combination of heat and humidity, referred to as the apparent temperature index, is a much better indicator of conditions within a localized area which are dangerous or life-threatening to the occupants.

Because it is both temperature and humidity which, together, have a disproportionate effect on an occupant's personal health and physical condition, these parameters together provide a more accurate warning signal, either to the occupant and/or interested government officials, that a predetermined apparent temperature threshold level has been exceeded. When that threshold level has been exceeded, some action is necessary to avoid health or life threatening conditions to the occupants.

Although weather-related temperature indicators or alarms, for use in weather monitoring applications, are available on the market separately, and humidity alarms are available separately, for example, from Wx Systems, made by Weather Systems Company of Santa Clara, Calif., and also a combined temperature and humidity indicator is available, no known apparent temperature alarm capable of use for protecting the health and/or lives of people most susceptible to extreme heat and temperature related conditions is available.

What is needed is a complete, stand-alone apparent temperature monitored alarm system which is operable without intervention by the occupant of a space which is being continually monitored for apparent temperature levels. Such a system should have adjustable threshold levels and further require an integral communication mechanism that warns not only the occupant of a monitored space that the apparent temperature has exceeded a threshold temperature, but also forwards that information to an off-site monitoring station, e.g., a local fire or police station, or health and safety office, so that the condition of one or more person(s) occupying a monitored space may be checked by responsible personnel. A timely investigation of an apparent temperature alarm may result in the removal of a person suffering from extreme apparent humidity to shelter, and thus saving of lives.

SUMMARY OF THE INVENTION

What is disclosed and claimed herein is an apparent temperature monitor and alarm for a monitored space comprising a temperature sensor which can generate a first electrical signal corresponding to a temperature level within the monitored space; a humidity sensor which can generate a second electrical signal corresponding to a relative humidity level within the monitored space; a central processor for utilizing the electrical signals generated by the temperature and humidity sensors to calculate the level of apparent humidity according to a predetermined formula; a transmitter for transmitting the first and second electrical signals from the temperature sensor and from the humidity sensor to the central processor; and an alarm in communication with the central processor for alerting health and safely personnel of life or health threatening conditions in the monitored space.

BRIEF DESCRIPTION OF THE DRAWINGS

FIG. 1 is a cross-sectional apparent temperature monitoring device according to the present invention; and FIG. 2 is a schematic illustration of an alarm system embodying a number of the devices illustrated in FIG. 1.

DETAILED DESCRIPTION OF THE PREFERRED EMBODIMENTS

Referring now to FIG. 1, a cross-sectional view of an embodiment of an apparent temperature monitor/alarm 10 is illustrated. The monitor/alarm 10 preferably comprises a container housing 12 shown in the form of a rectangular box comprising walls 14 and an attachable, removable cover 16. The cover 16 is removably attachable to the container housing walls 14 to complete an enclosed space 18 in which the operating elements of the monitor/alarm 10 are housed.

The housing cover 16 includes at least two apertures 18,20 through which the ambient environment outside the container 12 may be monitored. Attached to the housing cover 16, and adjacent each of the apertures 18,20, are disposed specific devices that monitor specified environmental parameters, such as temperature, humidity, etc. Shown in the embodiment of the monitor/alarm 10 of FIG. 1 are two such devices, a temperature sensor 22 adjacent aperture 20 and a humidity sensor 24 adjacent aperture 18. In this preferred embodiment, the sensors 22,24 comprise electronic devices such as are available commercially, for example, from Weather Systems Company of San Jose, Calif. (website—http://www.wxsystems.com), and others, but any kind of sensors may be used that are capable of generating a signal that accurately indicates at least the temperature and humidity levels of the ambient environment outside the container housing 12.

The temperature sensor 22 includes a means of monitoring temperature, such as a thermometer 26 extending through the aperture 20. Thermometer 26 may comprise a thermocouple or other temperature sensing device that, as in this preferred embodiment, can generate an electronic signal, which signal can be transmitted through a pair of lead wires 30 attached to a central processor 32. Similarly, the humidity sensor 24 also generates an electronic signal that accurately indicates, e.g., to within 1–2% accuracy, the relative humidity of the ambient environment outside the housing 12, and transmits it through a pair of lead wires 36 to the central processor 32.

Central processor 32 may be a CPU, which receives the electronic signal transmitted from sensors 22,24 and simply transmits the values of the temperature and humidity data to an off-site central processing unit that performs calculations according to a known formula so as to generate an apparent temperature value of the ambient environment outside of the housing 12. Transmission of the data may be accomplished through one or more known methods, for example, by radio or microwave transmission, by a direct, dedicated telephone line, or through a burglar alarm system.

Alternatively, and in accordance with the preferred embodiment shown in FIG. 1, the central processor 32 also includes a data processing function that is capable of direct on-site computation of the apparent temperature from the sensed temperature and humidity data which is received as electrical signals from the sensors 22,24. The central processor may then compare the computed temperature against one or more standard threshold apparent temperatures, and may alert health and safety officials or other interested personnel of the ambient environmental conditions exceeding the threshold values.

For example, the alert may be transmitted by one or more means, as shown. An antenna 40, attached to the central processor 32, may transmit the alert signal, via radio or microwave transmission, to the local office, police or fire station, or to a local health and safety office, so that the environmental conditions being monitored by the monitor/alert device 10 warn the officials that conditions have become urgent or dangerous to an occupant's life or health. Alternatively, the central processor may be connected to a telephone 44 by way of lead lines 42, and the central processor may have an automatic dialing capability that dials up an emergency telephone service, such as the ubiquitous "911" service. Other communication measures may also be used, such as a connection to a police station through existing burglar alarm systems. Alternatively, or in conjunction with any of the off-site alerts, a second set of lead lines 46 may be connected to a bell or other emergency alert device 48 to warn the occupants of the monitored space that conditions therein have become dangerous to their health and safety if the dangerous conditions persist, and they are exposed to these conditions for a prolonged period.

The power for operation of the monitor/alert device 10 may be obtained from the electrical power grid provided by the local electric utility or, as shown, by an independent power source, such as a battery. Preferably, however, power is obtained from an electrical outlet, in conjunction with a backup power source independent of the electrical grid, such as a rechargeable battery, in the event that a power blackout, or malfunctioning of the air conditioner systems, cause a change in the environmental conditions of a monitored space. It is important that some sort of backup system is in place to continue the monitoring and alarm capabilities of the device 10, even in the event of a power failure.

Referring now to FIG. 2, monitoring and alert system 60 is illustrated schematically. A number of separate monitor/alert devices, 10*a*, 10*b*, 10*c*, 10*d*, etc., each one being essentially identical to the device 10 shown in FIG. 1, are in communication with a base station 80. Although the system 60 is shown communicating by means of radio antennas 40*a*, 40*b*, 40*c*, 40*d*, etc., it is contemplated that alternative communications are also possible, as described above.

The base station 80 preferably includes a communications antenna 82 for receiving radio signals from each of the monitor/alert devices 10*a*, 10*b*, 10*c*, 10*d*, etc. The signals received by the base station 80 are transmitted electronically to a central monitoring location, such as a P.C. 86, which may monitor environmental conditions at several to seven hundred locations, either simultaneously or sequentially. The system may be set up to monitor several different parameters, including one or more thresholds to trigger alarms, to the person monitoring at the central monitoring location. For example, a listing of different locations, identified by address, telephone number and occupant name, may appear on the P.C. monitor screen, and the monitored apparent temperature may appear adjacent thereto. If environmental conditions are normal, the color of the occupant's identifying information may be colored green.

If the apparent temperature exceeds a predetermined first threshold level, the color of the identifying information on the particular location listed on the P.C. monitor may change to a yellow color, which alerts the responsible person that dangerous conditions have not been reached, but are being approached. Under such conditions, the responsible person may initiate a first level response, such as placing a telephone call to the occupant of the monitored space, so as to make inquiry of the health and condition of the occupant. During such telephone call, remedial measures may be suggested, such as turning on air conditioning or a fan, if available, or opening a window, in the event that the windows of the monitored location are closed. Continual monitoring may indicate that the suggested remedial measures result in a lowering of the apparent temperature to a more comfortable, but at least non-dangerous, level.

Alternatively, continuous monitoring may result in a second predetermined threshold level being reached, in which case the identifying information for an occupant of a monitored location may turn red in color, thus signifying the possibility of conditions dangerous to an occupant's health. In conjunction with such color change, a bell or other audible alarm may also be sounded so as to indicate the existence of urgent conditions. Under such circumstances, appropriate health or safety officers may be called upon to investigate whether an occupant is in danger of succumbing to the hazardous environmental conditions, so that the occupant may be given proper care or may be removed to a location which provides more accommodating conditions.

Referring again to FIG. 2, it is also considered as an alternative that communication between the remote locations, having the individual monitor/alert devices 10*a*, 10*b*, 10*c*, 10*d*, etc., may be supplemented with communication from the base station 80 to each device 10*a*, 10*b*, 10*c*, 10*d*, etc., such as to set off an on-site alarm in the remote location that is audible to neighbors or other interested personnel, and to alert them of the need to investigate the condition of their neighbors' residence.

While this invention has been described and illustrated in accordance with one or more preferred embodiments, it is recognized that modifications and alterations to the embodiments illustrated and described may become readily apparent once the features of this invention are fully understood. For example, it is contemplated that alternatives to the preferred embodiments may include additional environmental condition sensors, such as an integral fire alarm or carbon dioxide monitor/alarm, or burglar alarm (not shown). Such modifications may be considered to utilize the teachings of this invention as long as the other sensors include the disclosed temperature and humidity sensors which are available for generating data pertaining to apparent temperature. Accordingly, the invention has been illustrated and described herein in connection with preferred forms of the invention, and the invention has been described and illustrated above for purposes of description, and not of limitation, the invention herein being only limited by the following claims and their equivalents.

What is claimed is:

1. An apparent temperature monitor and alarm for a monitored space comprising:
    a) a temperature sensor generating a first electrical signal corresponding to a temperature level within the monitored space;
    b) a humidity sensor for generating a second electrical signal corresponding to a relative humidity level within the monitored space;
    c) a central processor for utilizing the first and second electrical signals generated by said sensors to calculate the level of apparent temperature according to a predetermined formula;
    d) a transmitter for transmitting said first and second electrical signals from said temperature sensor and from said humidity sensor to said central processor; and
    e) an alarm in communication with said central processor for alerting health and safely personnel of life or health threatening conditions in the monitored space.

2. The apparent temperature monitor and alarm according to claim 1 wherein said transmitter further comprises electrical connections to a central processor.

3. The apparent temperature monitor according to claim 2 further comprising a radio transmitter for transmitting the apparent humidity data from the monitored space to a remote monitoring location.

4. The apparent temperature monitor and alarm according to claim 3 wherein said radio transmitter further comprises a receiver to provide two-way communication with said remote monitoring location.

5. The apparent temperature monitor and alarm according to claim 1 wherein said transmitter further comprises a dedicated telephone providing a direct connection between said central processor and said remote monitoring location.

6. The apparent temperature monitor and alarm according to claim 1 wherein said transmitter is connected to a burglar alarm system.

7. The apparent temperature monitor and alarm according to claim 1 wherein said transmitter includes a connection to a telephone line and an auto-dialer to provide a telephone connection to an emergency response system.

8. The apparent temperature monitor and alarm according to claim 1 wherein said alarm includes an audible signal which warns the occupant of an apparent temperature reaching a predetermined level.

9. The apparent temperature monitor and alarm according to claim 8 wherein said alarm comprises a portion of a burglar alarm system.

10. The apparent temperature monitor and alarm according to claim 1 and further comprising a secondary power source independent of the electrical power grid.

11. The apparent temperature monitor and alarm according to claim 10 wherein said secondary power source further comprises a battery.

12. A monitoring and alert system for providing warning of ambient environmental conditions in a monitored location, comprising:
    a) a plurality of apparent temperature monitors, one each disposed in plural spaces to be monitored by said system;
    b) each said apparent temperature monitor being connected to at least one communication device which communicates with a remote central monitoring location;
    c) a remote communications receiver, disposed at said remote central monitoring location, for receiving communications from the apparent temperature monitors;
    d) said communications receiver being connected to a central monitor processor for providing warning, to an operator, when the apparent temperature of at least one monitored location has exceeded a predetermined threshold lever.

13. The system according to claim 12 wherein each said apparent temperature monitor comprises a temperature sensor generating a first electrical signal corresponding to a temperature level within the monitored space; a humidity sensor for generating a second electrical signal corresponding to a relative humidity level within the monitored space; and said communication device being capable of transmitting temperature and relative humidity data from said apparent temperature monitor to said remote communications receiver.

14. The system according to claim 12, wherein each apparent temperature monitor further comprises a local alarm connected to said apparent temperature monitor for alerting the occupant of a monitored space of detrimental health conditions.

15. The system according to claim 13, wherein each apparent temperature monitor further comprises a local alarm connected to said apparent temperature monitor for alerting the occupant of a monitored space of detrimental health conditions.

* * * * *